United States Patent [19]
Folchi et al.

[11] 3,948,093
[45] Apr. 6, 1976

[54] SIX DEGREE OF FREEDOM FORCE TRANSDUCER FOR A MANIPULATOR SYSTEM

[75] Inventors: George Arthur Folchi, Yorktown Heights; Glenmore Lorraine Shelton, Jr., Carmel; Sherman Sheau-Ming Wang, Mohegan Lake, all of N.Y.

[73] Assignee: International Business Machines Corporation, Armonk, N.Y.

[22] Filed: June 30, 1975

[21] Appl. No.: 591,998

[52] U.S. Cl. ............................................. 73/133 R
[51] Int. Cl.² ........................................... G01L 5/16
[58] Field of Search .................... 73/133 R; 308/2 A

[56] References Cited
UNITED STATES PATENTS

| | | | |
|---|---|---|---|
| 3,613,443 | 10/1971 | Curry | 73/147 |
| 3,628,394 | 12/1971 | Keatinge et al. | 74/471 XY |
| 3,771,359 | 11/1973 | Shoberg | 73/133 R X |
| 3,879,995 | 4/1975 | Libertiny | 73/133 R |

FOREIGN PATENTS OR APPLICATIONS

| | | | |
|---|---|---|---|
| 957,980 | 2/1957 | Germany | 73/133 R |

*Primary Examiner*—Charles A. Ruehl
*Attorney, Agent, or Firm*—Philip Young

[57] ABSTRACT

A six degree of freedom force transducer is provided on a manipulator's hand and includes a plurality of I-beam modules having strain gauges on the flat surfaces of the thin legs of each I-beam for measuring the bending moments of each leg. According to one embodiment, a pair of strain gauges are located on each side of the leg, providing a total of four gauges in each leg. The end bells of each I-beam are adapted to be rigidly interconnected with either other I-beams, structural members of the manipulator fingers, the drive member for the manipulator, or to intermediate coupling blocks designed to rigidly interconnect I-beams. A plurality of I-beams and interconnecting blocks can be connected in various configurations to provide a determination by the strain gauges of the six components of forces and moments which are applied by forces and moments on the fingers of the manipulator system. The I-beams and interconnecting blocks are arranged in x-y-z orthogonal directions such that the structural stiffness is in the same order in different directions. The moment at each basic module can be measured by the voltage output of a bridge associated with the strain gauges. In this fashion, a determination of the position and orientation of an object in the manipulator's hand can be readily provided by a computer which solves the force and moment equilibrium equations associated with the I-beam strain gauges.

13 Claims, 8 Drawing Figures

$V_R$ = CONSTANT $M_{\bar{Z}}$ AT POINT R

SIX DEGREE OF FREEDOM FORCE TRANSDUCER FOR A MANIPULATOR SYSTEM

BACKGROUND OF THE INVENTION

1. Field of the Invention

The present invention relates to force transducer measuring devices and more particularly to a force transducer used in a manipulator system providing six degrees of freedom.

2. Description of the Prior Art

In recent years, there have been proposed computer controlled manipulators to perform mechanical assembly work. In such proposed systems, one of the common problems is that of determining the orientation of the object held in the manipulator hand. Such proposed systems involve complex moving parts, difficult replacement of the transducer elements, and some systems do not provide six degree of freedom sensing. Also, the transducer devices presently available either provide a limited degree of sensing, such as tension and compression forces only, or involve complex apparatus which cannot be readily assembled or replaced. Also, the system equations in resolving the six degree of freedom force and movement vectors for the known transducers are complex and, therefore, difficult to handle by a real time computer control system where the computation time is very limited.

SUMMARY OF THE INVENTION

It is an object of the present invention to provide a six degree of freedom force sensor for a manipulator system. It is another object to provide a six degree of freedom force sensor which has no moving parts, is simple in design, and comprises sensor elements that can be readily replaced. It is a further object to provide a force sensor that provides modularity of the sensor elements. These and other objects are achieved by the present invention which provides a six degree of freedom force transducer for the hand of a manipulator system and includes a plurality of I-beam modules having strain gauges on the flat surfaces of the thin legs of each I-beam for measuring the bending moments of each leg. According to one embodiment, a pair of strain gauges are located on each side of the leg, providing a total of four gauges in each leg. The end bells of each I-beam are adapted to be rigidly interconnected with either other I-beams, structural members of the manipulator fingers, the drive member for the manipulator, or to intermediate coupling blocks designed to rigidly interconnect I-beams. A plurality of I-beams and interconnecting blocks can be connected in various configurations with the I-beams oriented at 90° twist and/or rotation from each other to provide a determination by the strain gauges of the six components of forces and moments which are applied on the fingers of the manipulator system. The moment and force at each I-beam module can be measured by the voltage output of a Wheatstone bridge associated with the strain gauges. The combined effect of structural rigidity and signal cancellations provides a strain gauge output at the Wheatstone bridge which is sensitive to forces and moments applied in only certain directions for each I-beam. In this fashion, a determination of the position and orientation of an object in the manipulator's hand can be readily provided by a computer which receives the Wheatstone bridge output and solves the force and moment equilibrium equations associated with the entire I-beam strain gauge configuration.

In this fashion, a modular force sensor is provided by the I-beam and intermediate coupling blocks. Also the orthogonality of the I-beam modules results in cancelling of the cross-coupling forces and moments between the sensor outputs, thereby simplifying the equations required for the forces applied to the manipulator hand.

DESCRIPTION OF THE PREFERRED EMBODIMENTS

Figure 1:
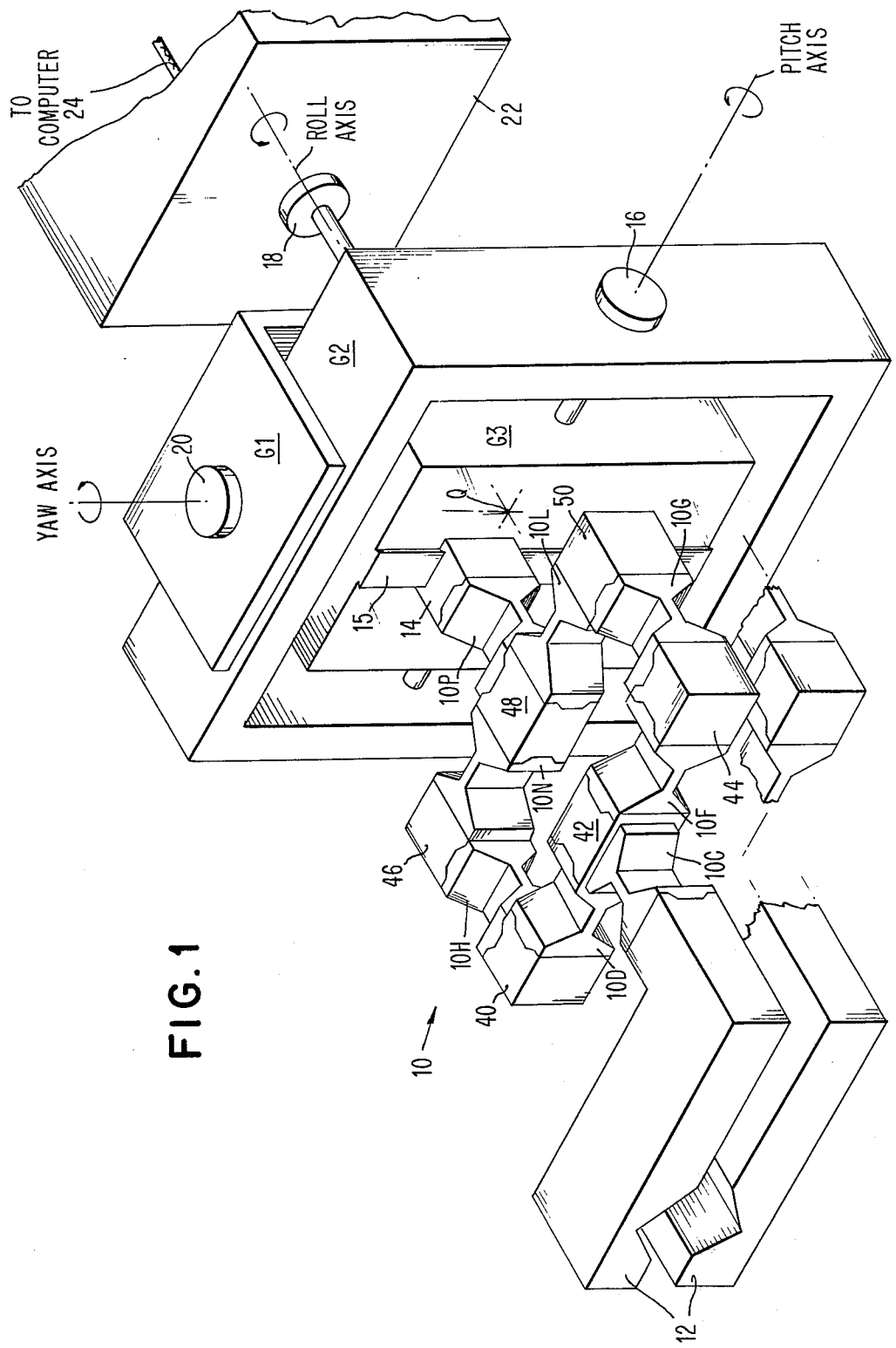
FIG. 1 is a schematic view of a six-component force transducer connected between the fingers and the finger drive block of a computer controlled manipulator, illustrative of one embodiment of the present invention.

Referring to FIG. 1, there is shown a pair of six degree of freedom force transducers 10 connected between each of a pair of fingers 12 and respective finger driver blocks 14 of a manipulator. Both blocks 14, upper one shown, are positioned on a guide track 15 and are under the control of computer 24. Pitch, roll and yaw motors 16, 18 and 20 respond to signals from a computer 24 for controlling the movements of the fingers 12 relative to an arm 22 of the manipulator device. The hand has three degrees of rotational freedom in pitch, yaw and roll axes. The wrist system consists of three blocks $G_1$, $G_2$, and $G_3$. Block $G_1$ can rotate with respect to the arm by a roll motor 18. Block $G_2$ can have relative rotation with respect to the block $G_1$ by a yaw motor 20 and the block $G_3$ can rotate with respect to the block $G_2$ by means of a pitch motor 16. The three rotating axes (pitch, roll, and yaw) coincide at point Q. Fingers 12 have the capability to open and close by the movement on the track of the blocks 14 driven by any suitable system, not shown, such as a motor driven rack and pinion. Given a specific position, fingers 12 can be locked into a rigid body firmly connected to the block $G_3$ through the six degree of freedom force transducer 10.

Figure 2B:
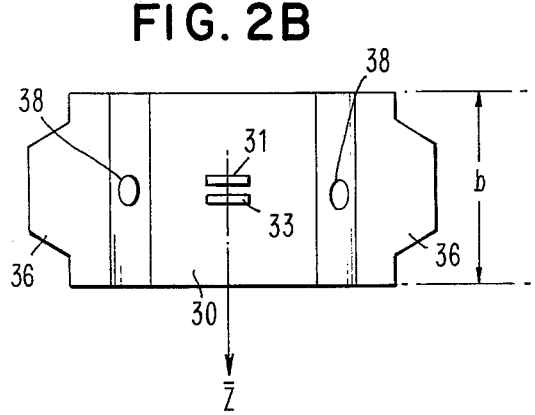
FIG. 2B is a top view of the module shown in FIG. 2A.
Figure 2C:
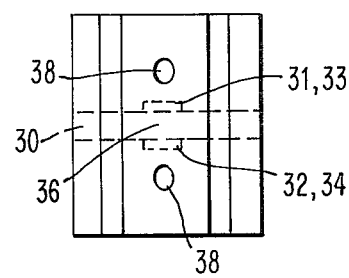
FIG. 2C is a side view of such module.
Figure 2A:
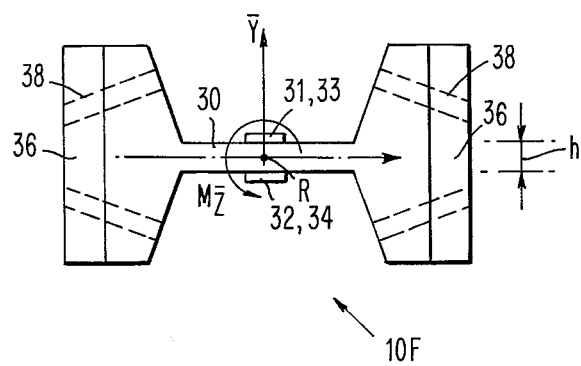
FIG. 2A is a front view of an I-beam module having strain gauges on its thin leg surfaces.

As shown in FIGS. 1, 2A, B and C, and 3, the sensor 10 comprises a plurality of modular I-beam structures indicated by the numerals 10C, 10D, 10F, 10G, 10H, 10L, 10N, and 10P. Each of these I-beam blocks is identical and is typically represented in the FIGS. 2A, 2B and 2C by the numeral 10F in order to generally indicate the specific structure of one member. In FIG. 2A, the I-beam module 10F comprises a thin beam 30 having flat surfaces on which a pair of strain gauges 31 and 33 are mounted on one side of beam 30 and a pair of strain gauges 32 and 34 are mounted on the other side. The ends 36 of the I-beam are shaped in the form of outwardly tapering flanges or bells and include four screw holes 38 for accommodating four screws for mounting the I-beam module 10F on an adjacent member as will be described.

Figure 5:
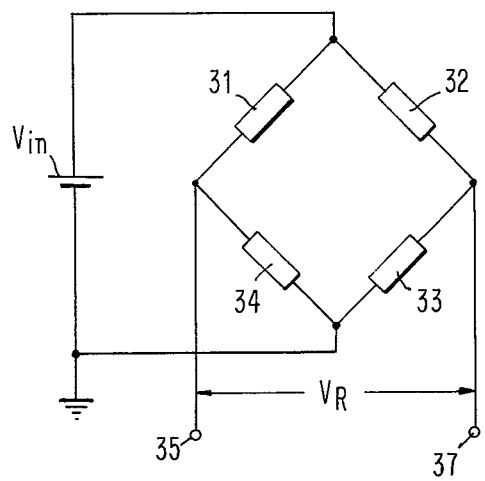
FIG. 5 is a circuit schematic of a Wheatstone bridge arrangement of the strain gauges associated with a single I-beam.

The I-beam 10F and its strain gauges 31-34 are essentially only sensitive to the bending moment $M_{\overline{Z}}$ about the $\overline{Z}$-axis as indicated by the coordinate and moment arrows shown in FIG. 2A. The $\overline{Z}$-axis, shown in FIG. 2B, comes out of the plane of the FIG. 2A through the point R. This bending moment $M_{\overline{Z}}$ is about the $\overline{Z}$-axis through point R, which is the center of the I-beam. Any force in the $\overline{Y}$-direction and any moment having a $\overline{Z}$ moment component, applied at an arbitrary point on the manipulator finger, will be translated to the moment $M_{\overline{Z}}$ about point R. The strain gauge output is not sensitive to the forces and moments applied in other directions. This is because of the combined effect of structural rigidity of the I-beam and the signal cancellations in the Wheatstone bridge arrangement of the strain gauges 31, 32, 33 and 34 shown in FIG. 5. Therefore, the voltage $V_R$ across the bridge junctions 35 and 37 does not vary with forces and moments applied at the finger other than those translated into $F_{\overline{Y}}$ and $M_{\overline{Z}}$ components.

The structure of the I-beam at each module enables a simple determination of the voltage output of the strain gauge system. For example, the output voltage $V_R$ across the Wheatstone bridge shown in FIG. 5 can be determined by the following formula:

$$V_R = V_{in} \times G.F. \times \frac{6 M_{\overline{Z}}}{E\, b\, h^2} = 1.5 \text{ volts}$$

where
$V_R$ = Predicted voltage output
$V_{in}$ = Input voltage = 5 volts D.C.
G.F. = Strain gauge factor = 155
$M_{\overline{Z}}$ = Maximum moment = 16.233 in.-lb.
E = modulus of Elasticity = $30 \times 10^6$ psi
b = Width of thin beam = 0.5 inches
h = thickness of thin beam = 0.070 inches This formula is used to determine the moment $M_{\overline{Z}}$ at a thin beam by supplying the voltage $V_{in}$ in such formula. The numerical values used in this formula are for illustration purposes only.

Figure 3:
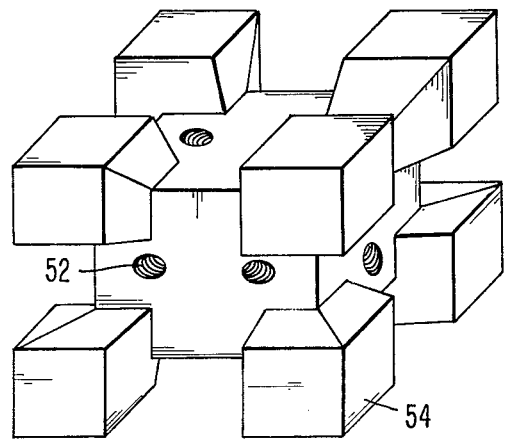
FIG. 3 is a schematic view of an intermediate block for interconnecting the strain gauge modules.
Figure 4:
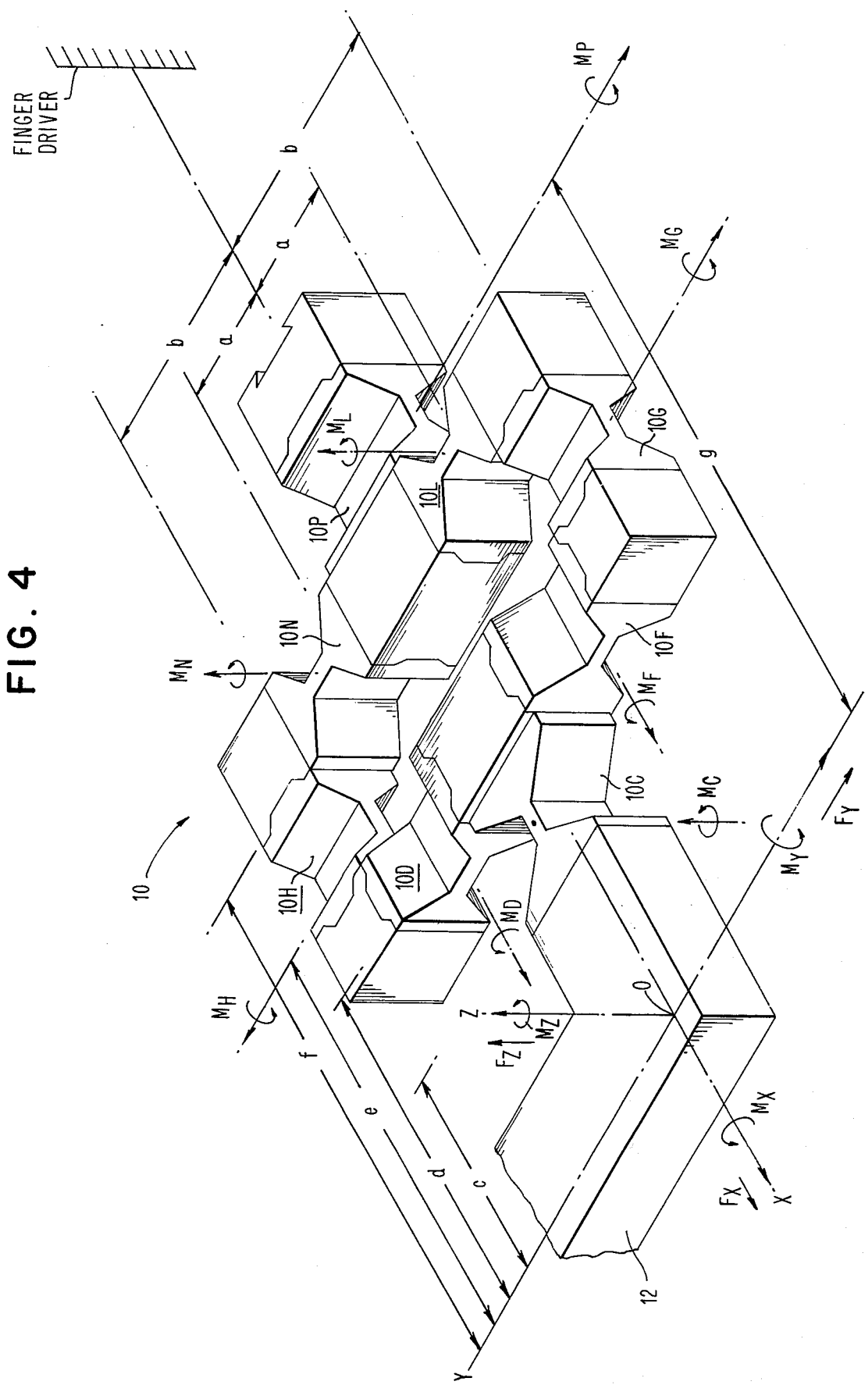
FIG. 4 is a perspective view of the sensor shown in FIG. 1, indicating the six components of forces and moments sensed by the transducers.

The desirable configuration of the sensor 10 shown in FIGS. 1 and 4 can be achieved by the use of intermediate blocks 40, 42, 44, 46, 48 and 50 which are shown interconnecting the I-beam modules. An intermediate block is shown in FIG. 3 and includes the threaded holes 52 which are aligned with the holes 38 of the I-beam, shown in FIGS. 2A, B and C, to permit the I-beam modules and the blocks to be fastened together. The intermediate blocks comprise corners 54 which interfit with the raised portions 36 of the I-beam. Thus, a basic I-beam such as 10F shown in FIG. 2A can be rigidly connected by four screws in the holes 38 with intermediate blocks at both ends of the I-beam. It should be apparent that with the modular transducer described, if one module should become damaged, it can easily be replaced. Also, since the basic modules are essentially the same, mass production becomes practical. Furthermore, the modules can be assembled in different configurations for the various applications.

Referring to FIG. 4, there is shown the moment and force components with reference to the specific point O for the strain gauge sensor system 10 shown also in FIG. 1. A force applied to any part of the manipulator fingers 12 can be computed with reference to the point O located at the intersection of the central longitudinal axis of the transducer and the finger axis. Any single force and moment applied at the finger of a manipulator system can be resolved into the six components of forces and moments ($F_X$, $F_Y$, $F_Z$, $M_X$, $M_Y$ and $M_Z$) with reference to the specific point O. The moment at each basic I-beam module can be measured by the voltage output of the strain gauge bridge shown in FIG. 5. The moments associated with each strain gauge block are indicated by M with a subscript identifying the block. For example, moments $M_D$, $M_F$, $M_G$, $M_H$, $M_L$, $M_N$, and $M_P$ are shown by the circular arrows and lines shown in FIG. 4. Each of these moments can be made into coordinate moments around the X, Y and Z axes. By using force and moment equilibrium equations, the moment at each basic I-beam module and the external loading and moment must satisfy the followng equations:

$$M_C = F_Y \times c + M_Z \tag{2.1}$$

$$M_D = F_Z \times \frac{a}{2} + M_X/2 \tag{2.2}$$

$$M_F = -F_Z \times \frac{a}{2} + M_X/2 \tag{2.3}$$

$$M_G = M_Y/2 - F_Z \times \frac{e}{2} - M_X \times \frac{(e-d)}{2b} \tag{2.4}$$

$$M_H = -F_Z \times \frac{e}{2} - M_Y/2 + M_X \times \frac{(e-d)}{2b} \tag{2.5}$$

$$M_L = F_X \times \frac{a}{2} + F_Y \times \frac{f}{2} + M_Z/2 \tag{2.6}$$

$$M_N = -F_X \times \frac{a}{2} + F_Y \times \frac{f}{2} + M_Z/2 \tag{2.7}$$

$$M_P = -F_Z \times g + M_Y \tag{2.8}$$

where
a is the distance from the center of I-beams 10D, F, L and N to the X-axis;
b is the distance from the center of I-beams 10G and H to the X-axis;
c is the distance from the center of I-beam 10C to the Y-axis;
d is the distance from the center of I-beams 10D and F to the Y-axis;
e is the distance from the center of I-beams 10G and H to the Y-axis;
f is the distance from the center of I-beams 10L and N to the Y-axis; and
g is the distance from the center of I-beam 10P to the Y-axis.

By combining equations (2.1) to (2.8), a set of six components of forces and moments can be obtained as follows:

$$F_X = (M_L - M_N)/a \tag{3.1}$$
$$F_Y = (M_L + M_N - M_C)/(f-c) \tag{3.2}$$
$$F_Z = (M_D - M_F)/a \tag{3.3}$$
$$M_X = (M_D + M_F) \tag{3.4}$$
$$M_Y = [(M_G + M_H) \times g - M_P \times e]/(g-e) \tag{3.5}$$
$$M_Z = [M_C \times f - (M_L + M_N) \times c]/(f-c) \tag{3.6}$$

It is noted that there are only nine multiplications required in the computation. This can be easily implemented in a time-sharing computer system where computation time is very limited.

Figure 6:
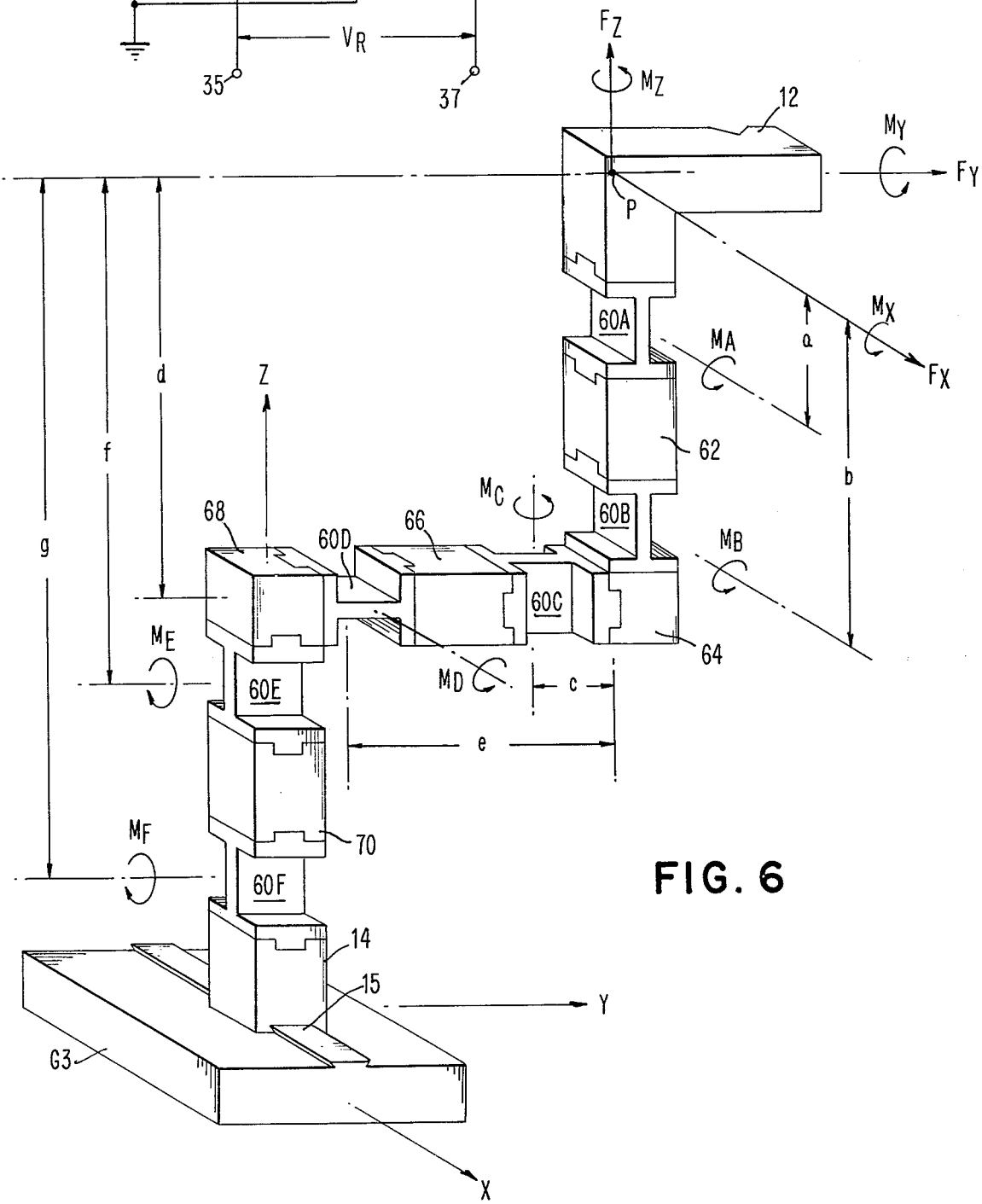
FIG. 6 is a schematic of another embodiment for a Z-shaped six degree of freedom force transducer.

An alternate pattern is shown in FIG. 6. The embodiment of FIG. 6 comprises six strain gauge modules 60A, 60B, 60C, 60D, 60E and 60F interconnected by intermediate blocks 62, 64, 66, 68 and 70. Driver block 14 is selectively moved along the track 15 of the gimbal G3 by a drive mechanism, not shown. Moments $M_A$, $M_B$, $M_C$, $M_D$, $M_E$ and $M_F$ are associated with the modules 60A through 60F having the same suffix letters.

Any single force and moment applied at any point of the finger 12 of the manipulator system can be resolved into the six components of forces and moments ($F_X$, $F_Y$, $F_Z$, $M_X$, $M_Y$ and $M_Z$) with reference to a Point P. Point P represents the intersection point of the finger axis and the axis passing through the centers of I-beams 60A and 60B. From the force and moment equilibrium equations, one obtains:

$$M_A = -F_Y \times a + M_X \quad (4.1)$$
$$M_B = -F_Y \times b + M_X \quad (4.2)$$
$$M_C = -F_X \times c + M_Z \quad (4.3)$$
$$M_D = -F_Y \times d + F_Z \times e + M_X \quad (4.4)$$
$$M_E = F_X \times f + M_Y \quad (4.5)$$
$$M_F = F_X \times g + M_Y \quad (4.6)$$

where
- $a$ is the distance from the center of module 60A to the point P;
- $b$ is the distance from the center of module 60B to the point P;
- $c$ is the distance from the center of module 60C to point P along the direction of the Y-axis;
- $d$ is the distance from the center of modules 60C and 60D to the point P along the Z-axis;
- $e$ is the distance from the center of module 60D to the point P along the Y-axis;
- $f$ is the distance from the center of module 60E to the point P along the Z-axis; and
- $g$ is the distance from the center of module 60F to the point P along the Z-axis. Combining equations (4.1) to (4.6), one obtains $$F_X = (M_F - M_E)/(g-f) \quad (5.1)$$
$$F_Y = (M_A - M_B)/(b-a) \quad (5.2)$$
$$M_X = [-M_B \times a + M_A \times b]/(b-a) \quad (5.3)$$
$$M_Y = (M_F \times f - M_E \times g)/(f-g) \quad (5.4)$$
$$M_Z = M_C + F_X \times C \quad (5.5)$$
$$F_Z = (M_D + F_Y \times d - M_X)/e \quad (5.6)$$

While the invention has been described in its preferred embodiments, it should be understood that other forms and embodiments may be made without departing from the true scope of the invention. For example, the invention may be adapted to provide less than six degree of freedom sensing, such as a three or four degree of freedom force sensor, by removing and/or re-arranging the modular I-beam configuration in orthogonal directions to provide sensing in those desired force and moment directions. Also, while the invention has been described with respect to determining the position and orientation of an object in the hand of a manipulator system, it should be understood that the invention also applies to other force measuring systems, such as for determining forces and moments on a joystick in either a manipulator system or in an aircraft control system, and for determining the cutting force exerted by machine tools, and to other force feedback control systems.

What is claimed is:

1. A multi-degree of freedom force sensor for providing force and moment data to determine the position and orientation of an object in the hand of a manipulator system, comprising a strain gauge assembly rigidly connected at a first end to said hand and rigidly connected at a second end to a drive member for said hand, said strain gauge assembly including a plurality of interconnected strain gauge modules, each of said strain gauge modules comprising a generally I-shaped beam having a thin central beam adapted for mounting strain gauges on its relatively wide, flat surfaces, and end portions of said I-beam providing means for rigidly interconnecting said strain gauge modules with the I-beam generally oriented at a 90° twist and/or rotation from each other, whereby said strain gauge modules can be configured in block-like fashion to provide a strain gauge assembly with the desired number of degrees of freedom sensing.

2. A sensor as recited in claim 1, further comprising interconnecting blocks providing means for rigidly connecting with an end portion of at least two of said I-beams, whereby said interconnecting blocks connects the strain gauge modules in a strain gauge assembly having the desired configuration.

3. A sensor as recited in claim 2, wherein each of said interconnecting blocks is adapted to connect two or more I-beams in a manner that permits dis-assembly of said I-beams.

4. A sensor as recited in claim 1, wherein each said central beam has a general rectangular plate shape, such that each of said strain gauge modules is essentially sensitive to moments about the axis extending transversely across said central beam and through its center, and sensitive to the forces that are perpendicular to the relatively wide, flat surfaces of said central beam.

5. A sensor as recited in claim 1, wherein a pair of strain gauges are mounted adjacent each other on each wide, flat surface of said central beam, providing a total of four strain gauges.

6. A sensor as recited in claim 5, wherein said four strain gauges are electrically connected in a Wheatstone bridge circuit with the opposite connected elements of said circuit being comprised of the pair of strain gauges on the same central beam surface.

7. A strain gauge assembly as recited in claim 1, wherein said strain gauge assembly comprises one of more of said strain gauge modules for individually sensing forces in respective $x$, $y$ and $z$ directions and for sensing moments about the $x$, $y$ and $z$ axes, thereby providing six degrees of freedom sensing of forces.

8. A multi-degree of freedom force sensor for providing force and moment data for forces applied via a control means, comprising
   a strain gauge assembly rigidly connected at a first end to said control means and rigidly connected at a second end to a movable part of the system, said strain gauge assembly comprising a plurality of interconnected strain gauge modules, each of said strain gauge modules comprising a generally I-shaped beam having a central beam with the relatively wide, flat surfaces for mounting strain gauges thereon; and
   means on the ends of said central beam for interconnecting said I-beams in orthogonal relationship with the other beams to provide a strain gauge assembly with the desired number of degrees of freedom sensing.

9. A sensor as recited in claim 8, wherein each of said strain gauge modules is identical.

10. A sensor as recited in claim 9, wherein each of said interconnecting means comprises one or more interconnecting blocks having means for rigidly connecting with the ends of said strain gauge modules to form the desired configuration for the strain gauge assembly.

11. A sensor as recited in claim 10, wherein each of said strain gauge modules is interconnected in orthogonal relationship with the other modules so that each strain gauge module is sensitive only to the forces that are perpendicular to the relatively wide flat surface of the central beam, and sensitive to the moments about the axis extending transversely across said beam and through its center.

12. A strain gauge assembly as recited in claim 8, wherein said strain gauge assembly comprises one or more of said strain gauge modules for individually sensing forces in respective $x$, $y$ and $z$ directions and for sensing moments about the $x$, $y$ and $z$-axes, thereby providing six degrees of freedom sensing of forces.

13. A sensor as recited in claim 8, wherein each I-shaped beam has mounted a pair of strain gauges on opposite sides of the relatively wide flat surfaces of the central beam, with the ones of each pair of strain gauges on the same side being connected at the opposite legs of a Wheatstone bridge circuit, the output of said Wheatstone bridge circuit providing a signal which is related to the forces applied to the I-shaped beam.

* * * * *